J. H. COCKRILL.
VEHICLE WHEEL RIM.
APPLICATION FILED NOV. 30, 1917.

1,389,937.

Patented Sept. 6, 1921.
3 SHEETS—SHEET 1.

Inventor
JAMES H. COCKRILL

By Harry C. Schroeder
Attorney

J. H. COCKRILL.
VEHICLE WHEEL RIM.
APPLICATION FILED NOV. 30, 1917.

1,389,937.

Patented Sept. 6, 1921.
3 SHEETS—SHEET 2.

Inventor
JAMES H. COCKRILL

By Harry C. Schroeder
Attorney

J. H. COCKRILL.
VEHICLE WHEEL RIM.
APPLICATION FILED NOV. 30, 1917.

1,389,937.

Patented Sept. 6, 1921.
3 SHEETS—SHEET 3.

Inventor
JAMES H. COCKRILL

By Harry C. Schwede
Attorney

UNITED STATES PATENT OFFICE.

JAMES H. COCKRILL, OF OAKLAND, CALIFORNIA.

VEHICLE-WHEEL RIM.

1,389,937.   Specification of Letters Patent.   Patented Sept. 6, 1921.

Application filed November 30, 1917. Serial No. 204,612.

*To all whom it may concern:*

Be it known that I, JAMES H. COCKRILL, citizen of the United States, residing at city of Oakland, in the county of Alameda and State of California, have invented certain new and useful Improvements in Vehicle-Wheel Rims, of which the following is a specification.

The present invention is an improved demountable rim for an automobile tire.

The object of the invention is to provide a rim possessing the requisite strength and rigidity which has the added advantage of being easily and quickly separable when it is desired to remove or replace a tire.

A further object is to provide a rim of such construction that the component parts are separable to allow the insertion of a tire, which may be carried in reserve on a car so that when it becomes necessary both rim and tire may be quickly mounted and secured in place on a wheel.

These objects have been accomplished by the novel structure described in the following specifications, and illustrated in the accompanying drawings, in which—

Figure 1:
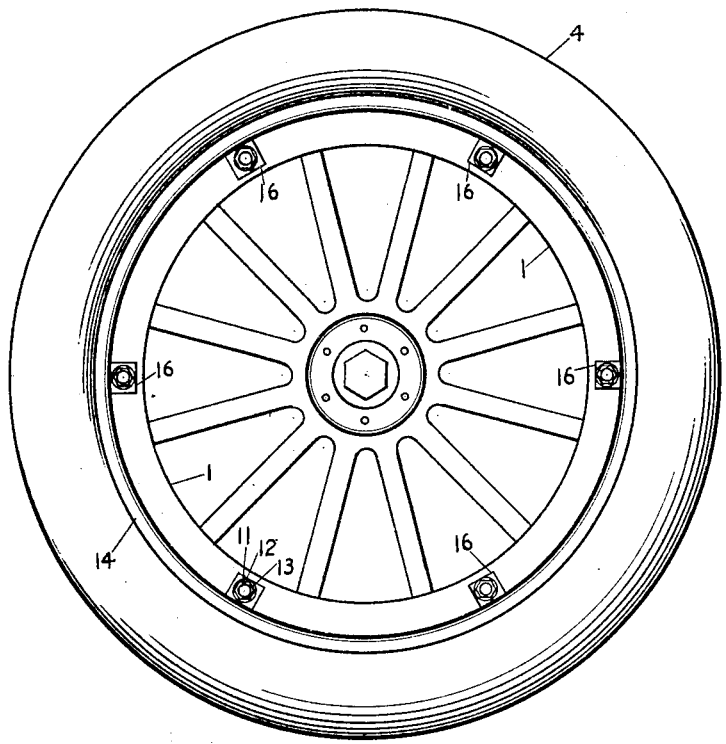
Figure 1 is a side view of an automobile wheel showing my improved detachable rim thereon.
Figure 2:
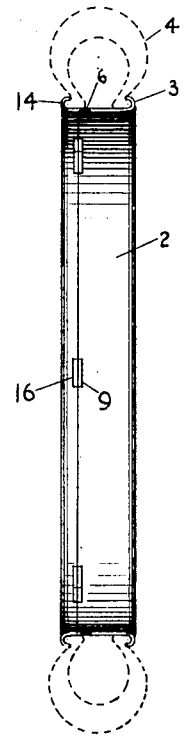
Fig. 2 is a vertical central section of my improved rim.
Figure 3:
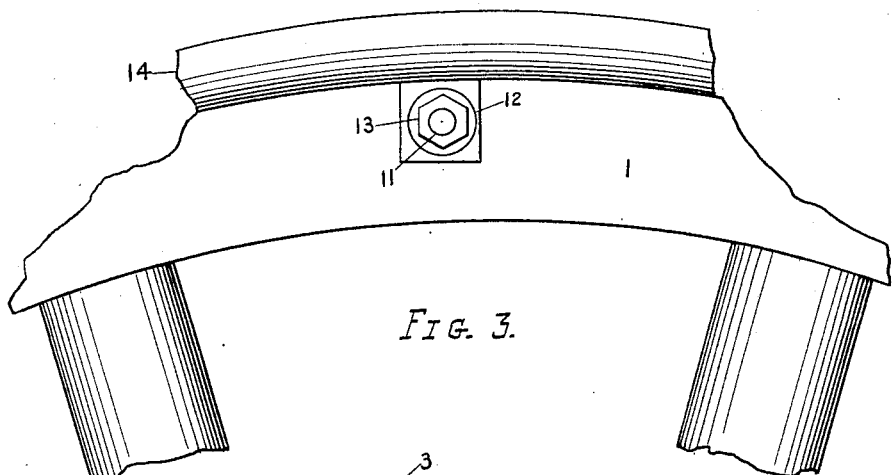
Fig. 3 is a fragmentary view of a wheel showing a mode of attachment of my rim to the felly of the wheel.
Figure 4:
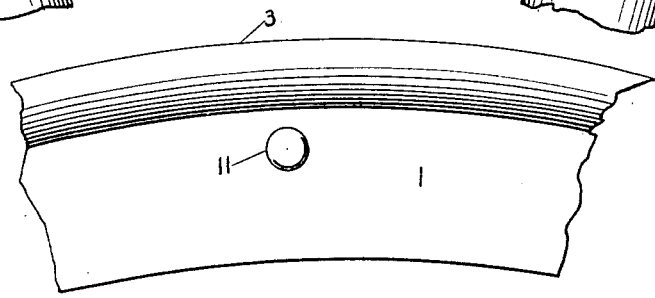
Fig. 4 is a view similar to Fig. 3 with a nut and washer removed.

Referring to the drawings, 1 indicates a felly of an automobile wheel. On the periphery of said felly is secured a member 2 of my improved rim. The member 2 is provided with a curved lip 3 on its outer edge, forming an annular groove for securing one side of the inner surface of a tire 4.

Figure 5:
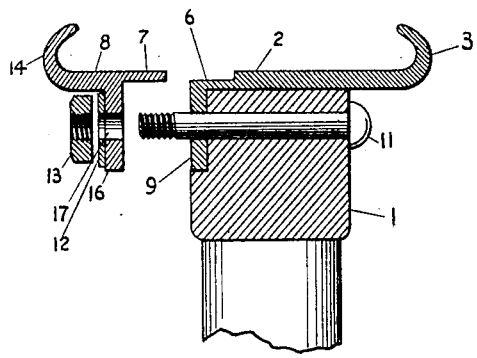
Fig. 5 is a vertical section of a felly and my improved rim showing the relation of the various parts.

The member 2 is secured to the felly as shown in Fig. 5, and has a portion of its flat part cut away at its edge forming a recess 6 to receive a lap 7 of a rim member 8.

The member 2 is provided at suitable intervals on the circumference with lugs 9 depending from its inner edge said lugs being integral with member 2 of the rim and bent to a plane perpendicular to the surface of the said member 2.

The lugs 9 are provided with holes through which pass bolts 11 on which are washers 12 and nuts 13.

The member 8 has a curved lip 14 similar to the lip 3 for engagement of the tire on the side opposite the lip 3. The said member 8 also has depending lugs 16 at intervals registering with the lugs 9. The lugs 16 also have holes 17 for the bolts 11.

It will be seen that when the member 2 is secured to the felly, a tire may be slid into place thereon and secured by placing the member 8 in position on bolts 11 extending through the felly. When it becomes necessary to remove said tire it will be necessary to remove nuts 13 and withdraw member 8 which allows the tire to be removed and replaced.

In order to carry an inflated tire in reserve for emergency use, I have provided a means of attachment for holding members 2 and 8. On the inner surface of the member 2 at suitable intervals are studs 18 on which are pivoted segment disks 19. The said disks 19 are provided with circular slots 21 coaxial with the studs 18. The purpose of the slots 21 is to engage arcuate lugs 22 welded or suitably attached to the inner surface of the member 2 of the rim. The circular slots 21 are rounded as shown at 23 to facilitate the entrance of lugs 22. The ends of the segment disks opposite the pivoted ends are serrated as shown at 24 to provide a means of forcing the said disks to rotate on their pivots and engage lugs 22.

Figure 6:
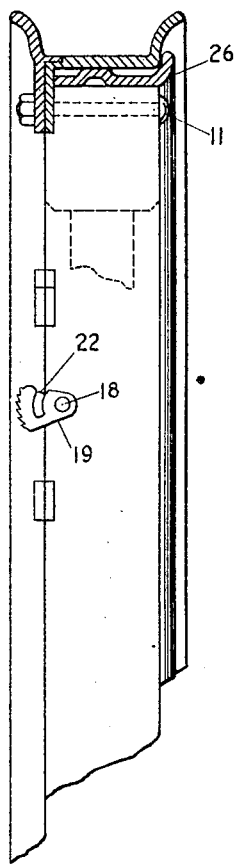
Fig. 6 is a fragmentary view of a modified form of my invention.

In Fig. 6 I have shown a straight side rim of the character described, which has been slid on the said wheel from the left side until it encountered a flange 26, in which position it has been secured by bolts 11.

Figure 7:
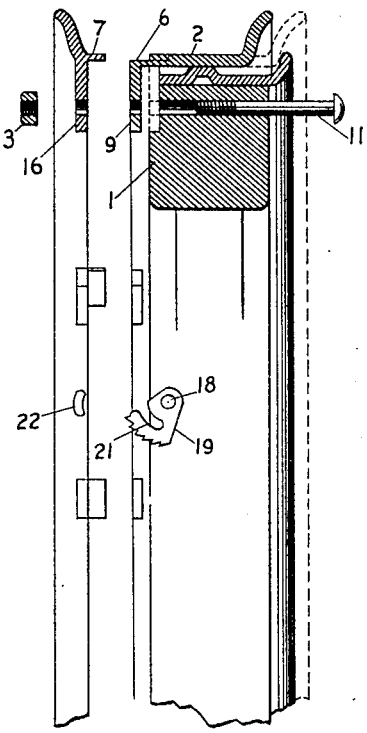
Fig. 7 is a fragmentary view of same showing it in relation to a wheel of different type from that shown in Figs. 1, 3, 4 and 5.
Figure 8:
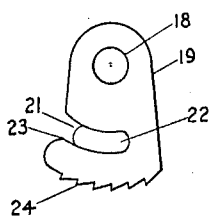
Fig. 8 is a plan view of a detail.

In Fig. 7, I have shown the same details separated.

Having described my invention, what I claim and wish to secure by Letters Patent is:—

A demountable rim comprising two annular members adapted to be joined together, each member having a plurality of inwardly radially projecting registering lugs with holes in said lugs for engagement of bolts, said annular members being provided with means for interlocking engagement comprising a plurality of studs, on one member, forming axes for keeper plates having serrated edges and circular grooves for engagement with lugs on the opposed annular member, said lugs being coaxial with said studs.

In testimony whereof I affix my signature.

JAMES H. COCKRILL.